Nov. 16, 1943.  C. H. GIBBONS  2,334,671
MACHINE FOR MAKING ELECTRICAL STRAIN GAUGES
Filed Feb. 6, 1942  3 Sheets-Sheet 1
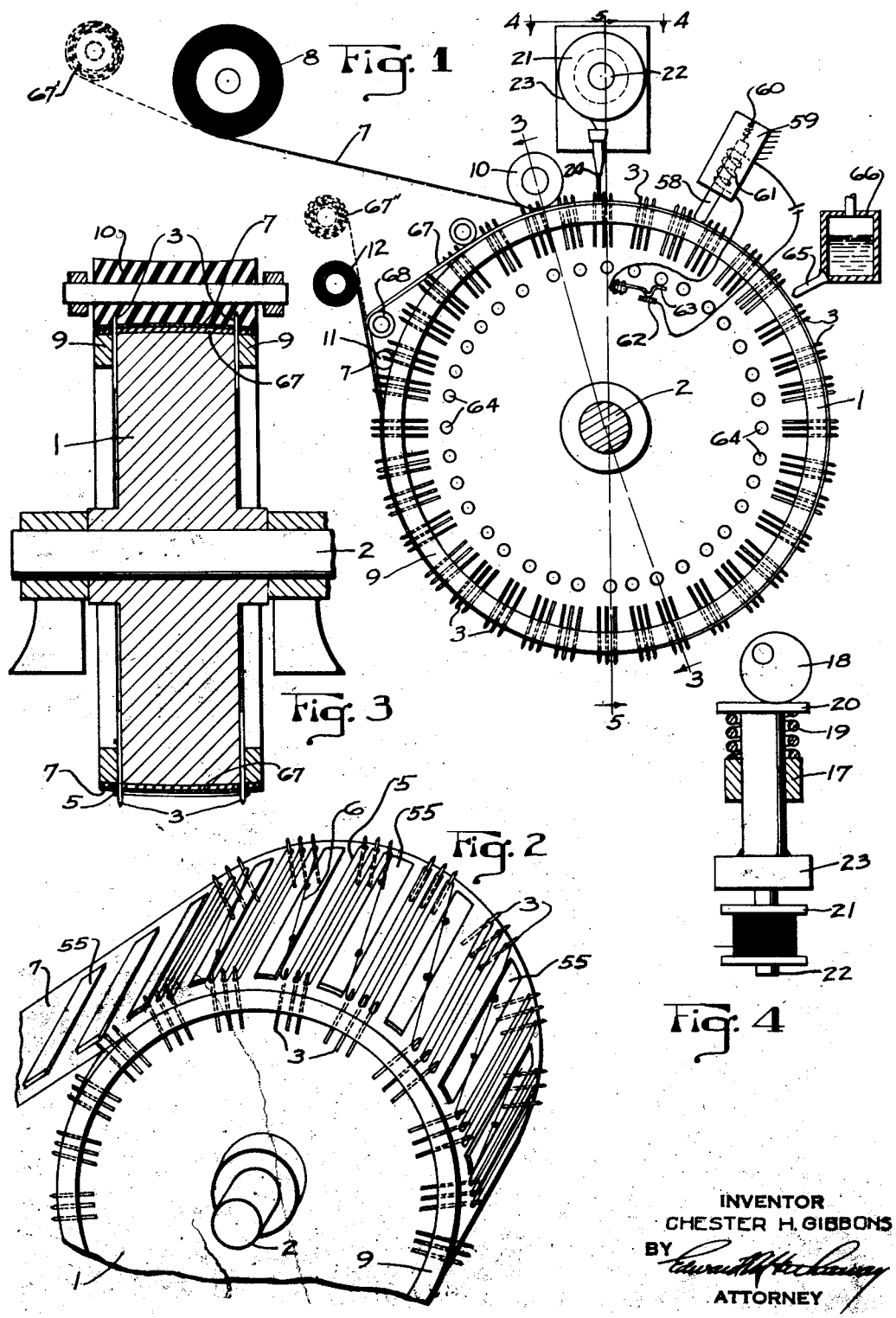
INVENTOR
CHESTER H. GIBBONS
BY
ATTORNEY Nov. 16, 1943. C. H. GIBBONS 2,334,671
MACHINE FOR MAKING ELECTRICAL STRAIN GAUGES
Filed Feb. 6, 1942 3 Sheets-Sheet 2

INVENTOR
CHESTER H. GIBBONS
BY
ATTORNEY

Nov. 16, 1943.  C. H. GIBBONS  2,334,671
MACHINE FOR MAKING ELECTRICAL STRAIN GAUGES
Filed Feb. 6, 1942  3 Sheets-Sheet 3

INVENTOR
CHESTER H. GIBBONS
BY
ATTORNEY

Patented Nov. 16, 1943

2,334,671

UNITED STATES PATENT OFFICE 2,334,671

MACHINE FOR MAKING ELECTRICAL STRAIN GAUGES

Chester H. Gibbons, Drexel Hill, Pa., assignor to The Baldwin Locomotive Works, a corporation of Pennsylvania Application February 6, 1942, Serial No. 429,800

12 Claims. (Cl. 140—71)

This invention relates generally to an improved apparatus for making strain gauges.

The strain gauge of the type herein disclosed employs the well-known principle that the electrical resistance of a filament varies in accordance with its strain, generally referred to as "electrical strain sensitivity." The filament is a metal wire of any suitable cross-section, preferably round and of a very small diameter of the order of approximately .001 to .003 of an inch. The wire can be "Constantan," "Iso-elastic," "Advance," or any one of innumerable metals whose strain sensitivity factors are well-known or may be readily determined. Due to the extremely small diameter of the wire filament it can be readily appreciated that considerable difficulty can be encountered in the mere handling of the wire, not alone laying it in a predetermined manner to form the gauge and having the filament of a predetermined precise length so that a plurality of gauges will have similar characteristics. One of the difficulties in insuring that the gauges will be of uniform resistance is in soldering or otherwise electrically connecting the relatively heavy leads to a precise position on the filament. On the other hand even though uniform resistance is obtained difficulty can be encountered in having a plurality of the gauges produce a uniform change in resistance for a given change in strain, this because the form of the windings of any two gauges may not be identical. For example, if the filament is of the type that is wound back and forth the radius of the reverse bends of different gauges may vary sufficiently so that either a smaller or larger percentage of the length of the bend is responsive to strain thereby causing different gauges to produce variable results even though each gauge as a unit is subjected to identical strain change. Because of these and other possible difficulties this general type of gauge has been heretofore wound and formed by hand on special jigs, thus permitting special care to be given to each gauge although increasing the cost of production.

It is an object of my invention to provide an improved gauge that is simple, economical, accurate and sensitive and is easy to apply and manufacture. Another object is to provide an improved apparatus for manufacturing strain gauges employing extremely fine wire. A further object is to provide an improved apparatus that is adapted to be continuous in operation; that will accurately and uniformly wind the very fine wire in a predetermined manner; and that will insure a high degree of gauge uniformity, all at a relatively low cost of manufacture, operation and maintenance.

Another object is to provide an improved apparatus whereby the structure and operation of the machine has a high degree of simplicity and insures that once the filament is wound it may be effectively cemented to a piece of thin paper with minimum opportunity of any disturbance or distortion of the filament from its originally wound condition.

Another object is to provide improved apparatus whereby the wound filament and paper medium may be effectively stripped or removed from the apparatus without distorting or disarranging the predetermined manner in which the filament is wound. A further object is to provide an improved feeding head for winding the filament so that it may effectively form a gauge of reversely wound filaments placed in very close substantially parallel relation.

Other objects and advantages will be more apparent to those skilled in the art from the following description of the accompanying drawings in which:

Fig. 1 is a diagrammatic side elevation of my improved apparatus;

Fig. 2 is a perspective view of the winding drum;

Fig. 3 is a transverse section taken substantially on the line 3—3 of Fig. 1;

Fig. 4 is a plan view of the winding head viewed from the line 4—4 of Fig. 1 with parts shown in section for simplicity;

Figure 5:
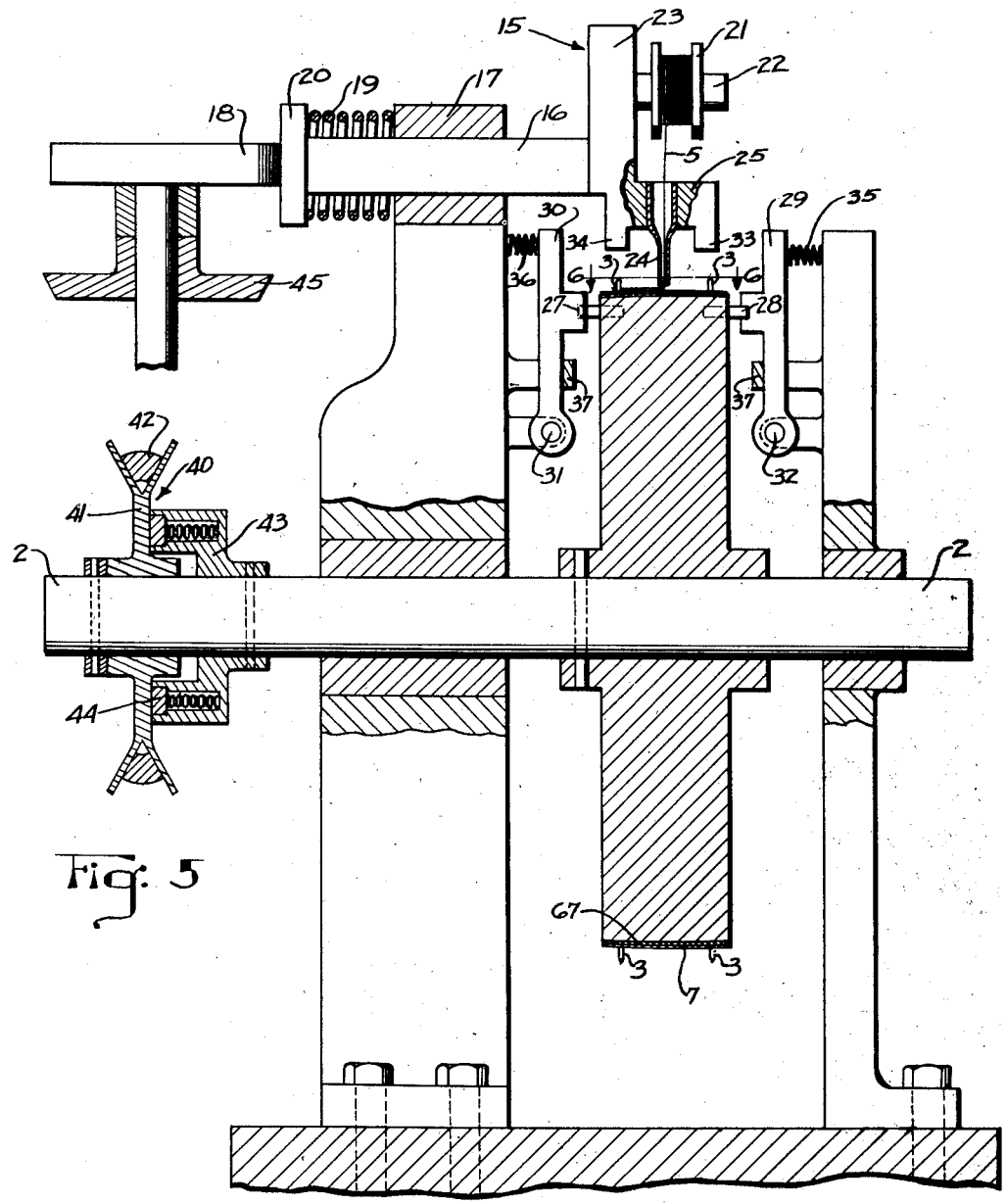
Fig. 5 is a vertical section taken substantially on the line 5—5 of Fig. 1.

In the particular embodiment of the invention disclosed herein for purposes of illustration, I have shown in Fig. 1 a drum 1 of any suitable diameter and width which, if desired, may be 5 to 10 inches in diameter suitably mounted on a shaft 2 for rotation in a clockwise direction. A series of winding posts or pins 3 are formed on each side of and in immovable or fixed relation to the drum 1, these pins being easily made by employing ordinary sewing needles of an appropriate diameter bonded or otherwise secured to the surface of the drum by any suitable cement, such as "Duco household cement." The pins are arranged in groups or sets whereby a gauge filament 5, Fig. 6, may be wound back and forth between the pins and then extend as at 6 in a diagonal manner to the next group of pins and so on around the drum. To provide additional width to the drum laterally of the winding pins, I provide a pair of annular rings 9 suitably held by screws or other means to the side of the drum, this also providing additional supports for the needle pins. A continuous strip of thin paper 7 is fed from a roll 8 on to the drum and to insure that the needles uniformly pierce the paper and cause it to be smoothly laid on to the surface of the drum a rubber roll 10 of a resilience about like the rubber of an automobile tire is journalled to permit the needles to force up into the rubber thereby snugly placing the paper around the base of the needles. The rubber roll is of such a diameter preferably four to seven inches in diameter for a ten inch diameter winding drum and the paper extends around the roll periphery in firm and taut contact therewith for such a distance that the paper is firmly supported from the instant that the point of each winding pin initially engages the paper down to the final positioning of the paper at the base of the pin and onto the drum surface. The roll 10 runs in tangent contact with the winding drum periphery and preferably with a slight pressure thereon. The winding needles penetrate the rubber roller after initially piercing the paper and the roll is rotated by the winding pins. The paper after it is pressed entirely on to the pins moves around with the drum and is not removed until it has passed to the other side where, if desired, a small roller 11 may be journalled between the rows of pins to remove the paper for winding upon a drum 12.

To wind the filament back and forth around the pins, I provide, as shown in Fig. 5, a winding head generally indicated at 15 comprising a shaft 16 of square cross-section or other suitable non-rotatable form axially slidable in a stationary bracket 17 and which is adapted to be reciprocated in any suitable manner diagrammatically shown as a cam 18 and return spring 19 interposed between bracket 17 and a collar 20 on shaft 16. A spool of filament wire 21 is journalled upon a pin 22 of suitable length to permit spool 21 to shift axially as the filament unwinds, this pin being secured in a head 23 formed integrally with shaft 16. A feeding tube 24 is supported in a lateral boss 25 of head 23, the lower end of the feeding tube being of very much reduced diameter to permit its passage between the closely spaced adjacent winding posts. One form of feeding tube that has been found satisfactory is a hypodermic needle cut square at its free end and its internal annular corner being suitably smoothed and curved to allow the filament to pass smoothly from the needle on to the paper although, if desired, a small jewel such as a ruby may be drilled with a small opening.

Figure 6:
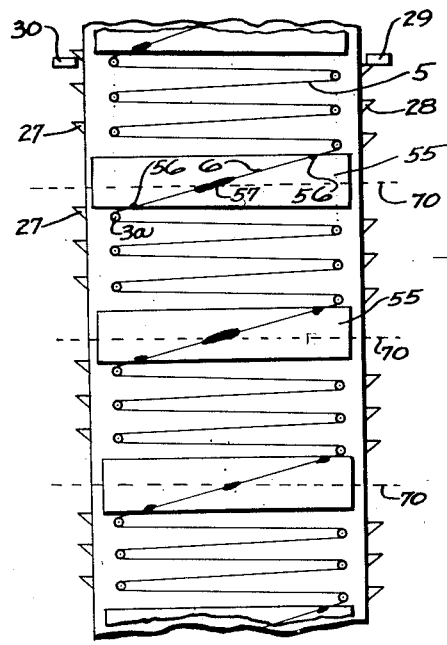
Fig. 6 is an enlarged plan view taken substantially on the line 6—6 of Fig. 5 showing a portion of the winding drum and escapement mechanism for feeding the same, as well as showing the general arrangement of the filament with respect to my improved lead arrangement.

To feed the drum step by step for the relatively small distances between the adjacent pins as well as to impart a relatively large feeding movement between the adjacent groups of pins, and to do this with a high degree of precision and timing both as to feeding the drum just after the feeding tube passes to the outside of a pin as well as rotating the drum through the small distance represented by the spacing between needles, I employ, as shown in Fig. 5, a plurality of sets of escapement teeth 27 and 28 alternately axially spaced apart and specifically shown as extending laterally in opposite directions from the two faces of the winding drum. These escapement teeth can, if desired, be somewhat in the form of pins tapered as shown in Fig. 5 and which, as shown in Fig. 6 are staggered circumferentially to effect a double spacing between the adjacent escapement teeth. This allows precision control to be obtained with relatively large teeth and spacing between the same, thus eliminating tedious workmanship on the pins themselves. Escapement pawls 29 and 30, specifically shown as pivotally supported at 31 and 32 on stationary portions of the frame, are adapted to be alternately released by extended fingers 33 and 34 of boss 25. Suitable springs 35 and 36 are adapted to normally maintain the pawls in the position shown in Fig. 5, by biasing the same against suitable stops 37. As the feeding head 15 moves back and forth it will first release, say pawl 29, whereupon the winding drum moves forwardly until one of the escapement teeth 27 engages pawl 30 whereupon when the head 23 moves to the left, Fig. 5. The head will then release pawl 30 thereby allowing the drum to rotate until the escapement tooth 28 on the other side engages its pawl 29, it being noted as shown in Fig. 5 that when one of the pawls, such as 29, is in engagement with its escapement tooth 29 the other pawl 30 lies between two of the escapement teeth 27 thus already being in a position to engage its next escapement tooth 27 when pawl 29 is released. The escapement teeth 27 and 28 may be individually positioned in the face of the winding drum so as to insure a high degree of precision positioning relative to its corresponding winding pin.

To effect a rotative bias on the winding drum so that it will rotate when an escapement pawl is released, I have provided a friction clutch diagrammatically indicated at 40 whose pulley 41 is driven by a belt 42 from a suitable motor, not shown. The pulley is journalled on shaft 2 while the component friction element 43 is pinned or otherwise secured to the shaft. By continuous rotation of pulley 41 the spring pressed friction plate 44 will be constantly urged in a rotative direction together with its shaft and winding drum. The speed of normal rotation of pulley 41 can be adjusted to determine the speed with which the winding drum rotates upon release of the escapement mechanism. An advantage of this general arrangement is that in forming the wide diagonal strand 6, Fig. 6, the escapement teeth are placed far enough apart to allow the pulley 41 to effect a relatively large angular movement of the winding drum while the feeding head is moving to the left. The first escapement tooth 27 of the new set of gauge pins will interrupt movement of the winding drum so that the feeding tube 24 may pass on the forward side of the winding post 3a. When the winding head reaches its leftmost position pawl 30 will be released whereupon the drum will then move forward and this will be followed by feeding tube 24 moving to the right behind pin 3a and so on for the remainder of the operation. This provides a very simple and positive escapement mechanism adapted to be easily made with a high degree of precision and is responsive to reasonable speed of operation. The timed relation between the operation of the feeding head and the escapement mechanism is self-contained so as to not involve cams or timing gears, it only being necessary to drive cam 18 through any suitable drive diagrammatically indicated as a gear 45.

Figure 7:
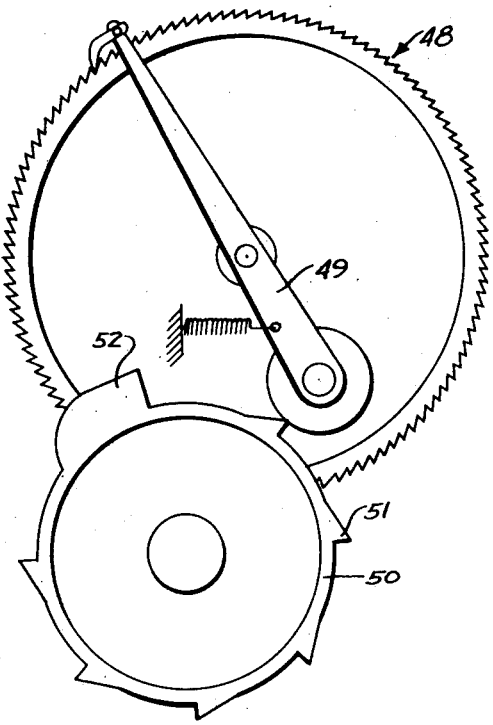
Fig. 7 is an enlarged diagrammatic outline showing a modified pawl and ratchet arrangement for feeding the winding drum.

If it is desired to employ a machined ratchet and pawl 48 as indicated in Fig. 7, then the pawl arm 49 may be suitably actuated by a cam 50 having a series of small cam surfaces 51 adapted to rotate the drum for a slight distance between adjacent winding pins of a gauge set while a relatively large cam surface 52 is adapted to move the drum a relatively large distance corresponding to the space between the sets of winding pins. It will be understood that in either form of drum feeding mechanism the diagonal strand 6 is preferably the result of simultaneous crosswise movement of feeding tube 24 and a rotative feeding movement of the drum.

It is of vital importance that the wire is as nearly uniform in length as possible. To accomplish this as well as to have the filament and heavy leads accurately relatively positioned, I have provided the strip of carrier paper 7 with a series of thin, flat metal leads 55 of copper or other suitable metal which may be .002 or .003 of an inch thick and of any desired width and length. These thin flexible leads are suitably cemented with "Duco household cement" or "Glyptal" to the paper strip at predetermined spaced points along the length of the paper. These spaced points are determined by the spacing between the sets of gauge pins for the respective gauges. Hence, as the paper strip 7 feeds on to the drum the leads 55 will automatically fall between the groups of winding pins and then as the feeding tube 24 winds the filament back and forth it will automatically cause the diagonal portion 6 of the filament to pass over the lead at a precise predetermined point in the length of the filament.

As the winding operation continues and the drum moves around, the filament is suitably soldered to the lead 55 either along the entire diagonal portion 6 in contact with the lead or at the two points 56 and, if desired, at 57. This soldering can be automatic by the provision of an electrically heated soldering iron 58 suitably supported in a stationary frame 59 and normally retracted by a spring 60 whereby a solenoid 61 is adapted when energized to move the soldering iron 58 into contact with the diagonal filament 6 and lead 55 to solder the same. The solenoid may be controlled by a switch having a stationary contact 62 and a radially movable spring contact 63 both suitably supported upon some portion of the bracket 17 at a point adjacent the side of the winding drum. Switch actuating cams or pins 64 may be secured to the side of the winding drum and so positioned as to close the switch when the winding drum is stationary, it being understood that the soldering iron would be moved inwardly to its soldering position only when the leads 55 were in position beneath the iron.

After the filament is soldered the next step is to cement the filament and paper together while the wound filament is still on the drum and without in any way removing the same. To effect this cementing operation a suitable spray nozzle 65 may be fed liquid cement from a reservoir 66 in which air pressure forces the relatively thin cement in spray form so as to cover the filament, leads and paper throughout its width. This cement will not only completely encase the very thin diameter filament in a wall of cement but also function as an insulation between the parallel filament strands.

After the cementing operation the paper and windings remain intact as an integral unit to move around with the drum until the other side of the drum is reached. By this time the cement is sufficiently or thoroughly dried so that the paper may be stripped from the drum together with the filament and leads which will be all retained in their original wound position without distortion or disarrangement, this because the cement has firmly bonded the same to the paper prior to being stripped from the drum. A factor which greatly facilitates strip stripping operation is that the sewing needles which are used as winding posts are not only highly polished and of small diameter but also have an appreciable tapered end.

If, however, the texture of the paper should be incapable under certain circumstances of offering adequate strength or rigidity to effect an initial separation of the cement which will naturally have been sprayed partially upon the pins, then the drum may be provided with a relatively stiff but flexible piece of cardboard or thin sheet spring metal 67, Fig. 1, this strip being endless and of greater length than the drum circumference thus permitting the strip to extend out over a roller 68. The relatively small roller 11 would then be placed beneath the stripping belt 67 which preferably would have openings through which the series of pins would extend thus allowing the stripping belt to underlie the full width of the paper so as to insure an even pull of the paper around the entire circumference of the pins. It will be understood that the length of the stripping belt 67 will be such that the successive group of holes can be progressively shifted to match the next group of pins, this being necessary because the total length of the stripping belt 67 is greater than the circumference of the winding drum. If it is desired not to employ holes then the stripping belt may be made in three sections, one for the portion between the two rows of pins and the other two sections for outside of the two rows. The stripping belt 67 may, if desired, be in the form of a continuous web of relatively heavy paper diagrammatically indicated in dotted lines as 67', Fig. 1, fed in with the gauge strip 7 on the underside thereof, the web and paper 7 both being wrapped around the rubber roll 10 a sufficient distance so as to be firmly supported when the needles pierce the web and paper in the manner previously described. To remove the gauge strip 7 from the drum the stripping web would be wound off of the drum separately from the gauge roll 12 as shown in dotted lines 67'', Fig. 1. The stripping web would thus act as the medium for exerting a radially outward force on the underside of the gauge strip 7 so as to force the same off of the winding posts to which the cement may have slightly adhered.

The winding drum may, if desired, be very slightly crowned to aid in maintaining a slight arched effect in the filament so as to maintain it in a straight condition, although the drum surface may have a straight face. The very slight crown of the drum will be compensated for during winding by the inherent resilience of the filament as it feeds in a curved form out of the end of the feeding tube 24. To expedite stripping of the paper the winding pins 3 may be placed entirely radially with respect to the axis of shaft 2 or under certain circumstances it may be desired to have the pins in each group placed parallel to each other, the group as a whole being placed radially with respect to the axis of shaft 2.

The strip of gauges wound on roll 12 may be cut into individual gauges merely by shearing or cutting lengthwise through the center of each lead 25 along dotted line 70, Fig. 6. The leads do not have to be cut accurately through their center as this does not affect the accuracy of the gauge, the gauge accuracy being determined solely by the point at which the filament is initially soldered to the lead. The relatively large area of the lead merely provides a convenient size to which relatively large wires may be soldered for connection to a Wheatstone bridge, oscillograph or other resistance measuring circuits such as are well-known and hence need not be described. It will be understood that the individual gauges usually form one or more arms of a Wheatstone bridge depending upon the particular type of test being made.

The gauges are applied to the surface of a member under test by first covering the test surface with Duco or other suitable bonding cement and then placing the gauge, preferably with its paper side, on to the cement and firmly pressing the paper on to the test surface so that the entire effective length of the filament is in effect bonded to the surface under test. This type of gauge is not only admirably adapted for manufacture in accordance with the method and apparatus herein disclosed, but also provides a very simple, direct and positive manner of automatically determining the gauge length of the filament as well as bringing the filament and lead automatically into a predetermined relationship.

This improved type of gauge permits the filament to be easily soldered and provides a very large lead area for subsequent attachment to an external wire. The filament is soldered while it remains in its originally wound position on the drum and the subsequent cementing of the filament also insures continuity of this initially wound condition of the gauge filament. The subsequent drying of the bonding cement before stripping the paper from the winding drum completes the maintenance of this initial condition of the gauge thereby insuring a very appreciable degree of uniformity between the various gauges. Another feature of the gauge is that when the strip of paper 7 is forced down over the sharp needle points a small amount of the paper is forced up around the needle when fully pressed to the base thereof, this paper forming a small collar, so to speak, encircling the needle and around which collar the filament is wound by the feeding tube 24. The subsequent cementing of the filament without removal or any movement of the filament relative to the pins insures that the filament will be maintained in its originally wound position around this paper collar.

It will of course be understood that various changes in details of construction and arrangement of parts may be made by those skilled in the art without departing from the spirit of the invention as set forth in the appended claims.

I claim:

1. A machine for forming a strain gauge comprising, in combination, a member having a plurality of fixed winding pins arranged in the desired form which the gauge is to take, a winding head having a filament feeding tube adapted to have relative movement around and between said pins thereby to wind the filament around the same, means for reciprocating said winding head, means for continuously biasing said pins to move in a direction transversely of said reciprocating motion, and escapement mechanism controlled by said winding head whereby at each end of the reciprocating stroke of said head the escapement mechanism is momentarily released to allow said biasing action to move the pins preparatory to a reverse movement of the winding head.

2. A machine for forming a strain gauge in which a filament is bonded to a strip of material comprising, in combination, a member movable always in the same direction and having a plurality of winding pins arranged in the form which the gauge is to take, a winding head having a filament feeding tube adapted to have relative movement around and between said pins thereby to wind the filament around the same, means whereby a continuous strip of material fed onto said member is adapted to be initially forced on to said pins ahead of said winding head whereby the filament is wound around said pins with the strip of material beneath the filament, and mechanism for effecting said relative movement between the pins and feeding tube in a predetermined timed relation thereby causing a continuous winding operation in which the strip of material feeds to said winding pins and has a filament wound thereon whereby the filament and strip may be bonded together so that they may thereafter be removed from the pins as a unit.

3. A machine for forming a strain gauge of the type in which a filament is wound in a predetermined manner and is connected to leads comprising, in combination, a member having a plurality of winding pins arranged in the desired form which the gauge is to take, means whereby a piece of material having leads pre-positioned thereon may be fed onto said member, means for winding a filament around said pins, and means for effecting a predetermined relative positioning of said material with respect to the filament so that the filament and leads are automatically brought into a predetermined position of contact with each other.

4. A machine for forming a strain gauge of the type in which a filament is wound in a predetermined manner and is connected to leads comprising, in combination, a member having a plurality of winding pins arranged in the desired form which the gauge is to take, means whereby a piece of paper having leads pre-positioned thereon may be fed onto said member, means for winding a filament around said pins, means for effecting a predetermined relative positioning of said paper with respect to the filament so that the filament and leads are automatically brought into a predetermined position of contact with each other, and means for subsequently effecting a permanent electrical bond between said filament and contacts while the filament remains on the pins.

5. A machine for forming a strain gauge of the type in which a filament is wound in a predetermined manner and is connected to leads comprising, in combination, a member having a plurality of winding pins arranged in the desired form which the gauge is to take, means whereby a piece of paper having leads pre-positioned thereon may be fed onto said member and forced on to said pins with the leads having a predetermined position relative to said pins, means for winding a filament around said pins and over the surface of said paper whereby the filament and leads are automatically brought into a predetermined position of contact with each other.

6. A machine for forming a strain gauge of the type in which a filament is wound in a predetermined manner and is connected to leads comprising, in combination, a member movable in one direction and having a plurality of relatively widely spaced sets of winding pins, each set having its pins relatively closely spaced in the desired form which the gauge is to take, a winding head having a filament feeding tube reciprocable relative to said pins to wind a gauge, means whereby when a gauge is wound around one set of said pins an extended relative movement is effected between the feeding tube and member to cause the filament to be fed across the wide space between the next adjacent set to start a winding operation around the closely spaced pins thereof, and means whereby the wound filament is adapted upon being bonded to a carrier member to be removable from said pins so as to retain said wound form.

7. A machine for forming a strain gauge of the type in which a filament is wound in a predetermined manner and is connected to leads comprising, in combination, a member movable in one direction and having a plurality of relatively widely spaced sets of winding pins, each set having its pins relatively closely spaced in the desired form which the gauge is to take, a winding head having a filament feeding tube reciprocable relative to said pins to wind a gauge, means whereby when a gauge is wound around one set of said pins the filament is then fed across the space between the next adjacent set to start a winding operation around the pins thereof, and means whereby a series of leads pre-positioned on a strip of paper so as to be spaced apart the same distance as the spacing between adjacent sets of pins are adapted to fall automatically between the sets of pins when the pins are forced through said paper, the filament when fed from one set of pins to the next adjacent set thereby automatically crossing over the pre-positioned leads and establishing a predetermined relation between the leads and filaments.

8. A machine for forming a strain gauge of the type in which a filament is wound in a predetermined manner and is connected to leads comprising, in combination, a member movable in one direction and having a plurality of relative widely spaced sets of winding pins, each set having its pins relatively closely spaced in the desired form which the gauge is to take, a winding head having a filament feeding tube reciprocable relative to said pins to wind a gauge, means whereby when a gauge is wound around one set of said pins the filament is then fed across the space between the next adjacent set to start a winding operation around the pins thereof, means whereby a series of leads pre-positioned on a strip of paper so as to be spaced apart the same distance as the spacing between adjacent sets of pins are adapted to fall automatically between the sets of pins when the pins are forced through said paper, the filament when fed from one set of pins to the next adjacent set thereby automatically crossing over the pre-positioned leads and establishing a predetermined relation between the leads and filaments, means for applying a liquid bonding cement to said filament and paper while it remains on the pins, and means whereby the filament and paper are removed as a unit from the drum after the cement has sufficiently dried to firmly secure the filament winding on the paper.

9. The combination set forth in claim 8 further characterized in that said leads are relatively thin flat metal members of sufficient width that when cut in half two leads are formed, one for each of the adjacent gauges.

10. A machine for forming a strain gauge of the type in which a filament is wound in a predetermined manner comprising, in combination, a drum having a plurality of winding pins arranged in the desired form which the gauge is to take, stripping means movable with the drum around the periphery thereof, means whereby a continuous strip of paper is adapted to be fed on to said drum with the pins forced through the paper whereby said paper overlies said stripping means, means for winding a filament around said pins, and means for cementing said filament and paper together, while they remain undisturbed on said drum whereby after said cement has sufficiently dried said stripping mechanism is adapted to remove the paper and filament as an integral unit from the pins.

11. A machine for forming a strain gauge of the type in which a filament is wound in a predetermined manner and is connected to relatively heavy leads comprising, in combination, a rotatable drum having a plurality of winding pins arranged n the desired form which the gauge is to take, means whereby a piece of paper having leads pre-positioned thereon is adapted to be fed onto the periphery of said drum, means for winding the filament around said pins and over the surface of said paper and over said leads so that the leads and filament have a predetermined relative position to each other, and means for effecting a permanent electrical bond between the filament and leads automatically as said drum progresses in its rotary direction.

12. A machine for forming a strain gauge of the type in which a filament is wound in a predetermined manner comprising, in combination, a drum having a plurality of winding pins arranged in the desired form which the gauge is to take, a rubber roller having its periphery in substantially tangential contact with the winding drum periphery, means whereby a continuous strip of paper is adapted to be initially fed on to the periphery of said rubber roller so that the paper is firmly supported at the time each winding pin engages the paper and such firm support continues until the paper is finally positioned at the base of said pin and on to the winding drum surface, and means for winding a filament around said pins over the portion of the paper strip mounted on the winding drum.

CHESTER H. GIBBONS.